3,804,893
PROCESS FOR THE PREPARATION OF
N-ACYLDOPA
Hirofumi Nakano, and Takeo Suzuki, Tokyo, Japan, assignors to Kyowa Hakko Kogyo Co., Ltd., Tokyo, Japan
No Drawing. Filed Apr. 5, 1971, Ser. No. 131,499
Claims priority, application Japan, May 4, 1970, 45/37,491
Int. Cl. C07c 101/08
U.S. Cl. 260—519  10 Claims

ABSTRACT OF THE DISCLOSURE

A process for the preparation of N-acyldopa compounds comprising reacting an N-acyltyrosine with an endiol compound in the presence of ferrous ion and oxygen.

---

This invention relates to a method of preparation of N-acyldopa compounds. More specifically, this invention relates to a method of preparation of N-acyldopa compounds characterized by the reaction of an N-acyl derivative of L-tyrosine with ascorbic acid or a similar endiol compound in the presence of ferrous ion and oxygen.

The N-acyldopa compounds prepared by the method of the present invention can readily be deacylated to form L-dopa i.e., 3-(3,4-dihydroxyphenyl)-L-alanine. L-dopa is a highly stable compound and is pharmaceutically useful, e.g., in the treatment of nervous disorders. Various chemical methods for the preparation of L-dopa from tyrosine are known in the art. For example, treating tyrosine with the so-called Fenton reagent, i.e., hydrogen peroxide and ferrous salt, under nitrogen results in a low yield of L-dopa due to the fact that the product decomposes readily. Another known method of producing dopa from tyrosine involves the Udenfriend process. This method comprises treating tyrosine with a system consisting of ferrous sulfate, oxygen, ascorbic acid and ethylenediaminetetraacetic acid. This process results in an extremely low yield of dopa because of the low solubility of tyrosine and is therefore not suitable for the industrial production of dopa. This process for the preparation of L-dopa would be most desirable if the solubility of tyrosine could be increased.

The present inventors have found that an L-tyrosine compound where the amino group has been acylated has a solubility at least ten times as great as the unacylated tyrosine. This N-acylated tyrosine can be treated according to the Udenfriend process resulting in the formation in grood yield of an acylated L-dopa compound. It has further been found that the acylated L-dopa produced by the present invention is stable even if the reaction time is prolonged up to 100 hours. Furthermore, it is an advantage of the present process that upon completion of the reaction, the reaction solution contains only unreacted N-acyltyrosine, N-acyldopa and oxidized ascorbic acid compounds. Other substrate decomposates and product decomposates are rarely observed. The desired N-acyldopa and the unreacted substrate can be easily separated and the latter reused, if desired. The N-acyldopa can be readily converted to L-dopa by known deacylation procedures.

The N-acyltyrosines useful in the present invention are those compounds wherein the acyl group is of the general formula RCO— wherein R is selected from the group consisting of hydrogen and lower alkyl groups containing from 1 to 6 carbon atoms. Specific N-acyltyrosines include N-formyltyrosine, N-acetyltyrosine, N-propionyltyrosine, N-butyryltyrosine and the like. Preferred N-acyltyrosines include N-formyltyrosine and N-acetyltyrosine.

The N-acyltyrosine is converted to N-acyldopa by reaction with an organic endiol compound, i.e. a compound containing the group

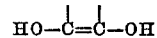

or a tautomeric form thereof. Ascorbic acid is preferably used in the process of the present invention. Other endiol compounds which react similarly to ascorbic acid can also be utilized. Specific examples of other compounds include dihydroascorbic acid, D-isoascorbic acid (araboascrobic acid), diketogulonic acid, dihydroxymaleic acid diketosuccinic acid and the like.

Any suitable source of ferrous ions can be used in the process of the present invention, e.g., the ferrous salts such as ferrous sulfate. Oxygen is most readily introduced by aeration or by vigorous stirring of the reaction components. Ethylenediaminetetraacetic acid or a salt thereof is preferably added in order to increase the reaction rate and the reaction is preferably carried out in a phosphoric acid buffer solution. Other buffer solutions which may be utilized include boric acid and citric acid buffer solutions.

In carrying out the present invention, for example, an N-acyltyrosine is dissolved in a 0.2 M phosphoric acid buffer solution to give a concentration of about 1 mg./ml. to 30 mg./ml. of N-acyltyrosine. Ferrous ion and disodium ethylenediaminetetraacetate (hereinafter referred to as "EDTA") are added thereto to give a concentration of ferrous ion (as $FeSO_4 \cdot 7H_2O$) of about 0.1 mg./ml. to 5 mg./ml. and a concentration of EDTA of about $10\mu$ moles/ml. to $100\mu$ moles/ml., respectively. Further, L-ascorbic acid is added thereto in the range of about 1 mg./ml. to 200 mg./ml. just before the reaction or during the reaction, preferably intermittently. The reaction is carried out at temperatures of about 5° C. to 90° C., typically about 30° C., in a pH range of about 3 to 7 with vigorous aeration and/or stirring. The reaction time is about 1 to 48 hours and the reaction is deemed complete when the maximum yield of N-acyldopa is obtained.

After the completion of the reaction, a Sephadex (a trademark of Pharmacia Fine Chemicals, Inc. U.S.A. for a hydrophilic, insoluble molecular-sieve chormatographic medium, made by cross-linking dextran) column is used to separate the unreacted substrate and reaction products from the reaction solution. The reaction solution is passed through a column having a volume 5 to 20 times as great as the volume of the reaction solution. The column is washed with sufficient amounts of water to wash off the oxidation products of the ascorbic acid or other endiol compounds. Then, a buffer solution such as phosphoric acid buffer is passed through the column as an eluting agent, whereby the unreacted substrate and the reaction product can be separated. The unreacted substrate fraction can be recycled, if desired.

The N-acyldopa reaction product fraction can then readily be converted to L-dopa by known deacylation procedures. For example, the N-acyldopa fraction can be concentrated at room temperature under a reduced pressure and the N-acyl group can be removed by acidifying the concentrate with a suitable acid, e.g., acetic acid. The resulting L-dopa compound is then neutralized and filtered. The filtrates are washed with cold water, recrystallized in water and dried.

Now, the present invention will be further explained, referring to the following examples, but these examples are merely illustrative and do not restrict the scope of the present invention.

EXAMPLE I 100 mg. of N-formyltyrosine, 250 mg. of L-ascorbic acid, 5 mg. of FeSO$_4$·7H$_2$O and 15 mg. of EDTA are dissolved in 5 ml. of a 0.2 M phosphoric acid buffer solution (pH=6.0), and a reaction is carried out at 30° C. for 24 hours in a 50 ml. test tube with vigorous shaking. Samples are taken periodically and a portion thereof is subjected to paper chromatography using a solvent system of chloroform:methanol:acetic acid:water (10:3:3:3). Diazosulfanilic acid is sprayed on the paper strip to indicate the zones. Changes of the substrate and the product are examined and the formation of N-formyldopa is confirmed. As a result of quantitative analysis with sodium tungstate, the formation of 40 mg. of N-formyldopa is confirmed.

EXAMPLE II 2 g. of N-formyltyrosine, 5 g. of L-ascorbic acid, 100 mg. of ferrous sulfate and 200 mg. of EDTA are dissolved in 100 ml. of 0.2 M phosphoric acid buffer solution (pH=6.0) and the reaction is carried out at 35° C. for 24 hours in a reactor flask having a capacity of 500 ml. Aeration is carried out at a rate of 200 ml./min. while stirring at 800 r.p.m. As a result of quantative analysis with sodium tungstate, it is confirmed that 0.95 g. of N-formyldopa are formed.

The reaction solution is then passed through a column (diameter: 7 cm., height: 100 cm.) packed with Sephadex G–10 (a trademark of Pharmacia Fine Chemicals, Inc., U.S.A. for hydrophilic, insoluble molecular sieve chromatographic medium, made by cross-linking dextran) and the oxidation products of ascorbic acid are washed away by passing sufficient amounts of water through the column. Then, elution is carried out by passing a 0.05 M phosphoric acid buffer solution through the column at a flow rate of 20 ml./min. The relative amounts of substrate and reaction product contained in the eluate are determined from the ultra-violet absorption spectrum. 400 ml. of the substrate elution fraction are utilized as a portion of the next reaction solution, while 450 ml. of the reaction product fraction are immediately concentrated at 45° C. under a reduced pressure.

About 20 ml. of the concentrated aqueous solution are acidified with acetic acid and held at 15° C. for 8 hours to remove the formyl group. The pH is then adjusted to about 5–6. Free L-dopa is recovered as an insoluble precipitate and this precipitate is filtered, washed with cold water and dried to give 0.72 g. of L-dopa. After recrystallization, the precipitate is confirmed to be L-dopa by means of IR-spectrum, UV-absorption spectrum, and paper chromatography.

EXAMPLE III

A reaction is carried out according to the procedures of Example I except that N-acetyltyrosine is used as a substrate in place of N-formyltyrosine. This reaction results in the recovery of 60 mg. of N-acetyldopa which is then isolated and recovered according to the procedures of Example II to yield of 40 mg. of L-dopa crystals.

EXAMPLE IV

Reactions are carried out according to the procedure of Example I using the following endiol compounds. The noted yields of N-formyldopa are obtained.

|  | Percent conversion to N-formyldopa |
|---|---|
| L-ascorbic acid, 20 mg./ml. | 47 |
| Dihydroascorbic acid, 20 mg./ml. | 40 |
| D-isoascorbic acid (araboascorbic acid), 20 mg./ml. | 42 |
| Diketogulonic acid, 20 mg./ml. | 38 |
| Dihydroxymaleic acid, 20 mg./ml. | 35 |
| Diketosuccinic acid (diethylester), 20 mg./ml. | 37 |

What is claimed is:

1. A process for the preparation of an N-acyldopa compound comprising reacting an N-acyltyrosine having a concentration of about 1 mg./ml. to 30 mg./ml. with about 1 mg./ml. to 200 mg./ml. of an organic endiol compound containing the group

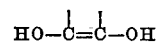

or a tautomeric form thereof in the presence of ferrous ion and oxygen at a pH of from about 3 to 7 and a temperature of about 5 to 90° C.

2. The process of claim 1 wherein the N-acyltyrosine contains an N-acyl group of the general formula RCO— wherein R is selected from the group consisting of hydrogen and lower alkyl groups containing 1 to 6 carbon atoms.

3. The process of claim 1 wherein the N-acyltyrosine is selected from the group consisting of N-formyltyrosine, N-acetyltyrosine, N-propionyltyrosine and N-butyryltyrosine.

4. The process of claim 1 wherein the N-acyltyrosine comprises N-formyltyrosine.

5. The process of claim 1 wherein the endiol compound is selected from the group consisting of ascorbic acid, dihydroascorbic acid, D-isoascorbic acid, diketogulonic acid, dihydroxymaleic acid and diketosuccinic acid.

6. The process of claim 1 wherein the endiol compound comprises ascorbic acid.

7. The process of claim 1 wherein the reaction is carried out in the presence of ethylenediaminetetraacetic acid.

8. A process for the preparation of L-dopa comprising the steps of
(a) reacting an N-acyltyrosine having a concentration of about 1 mg./ml. to 30 mg./ml. with about 1 mg./ml. to 200 mg./ml. ascorbic acid in the presence of ferrous ion, oxygen and ethylenediaminetetraacetate at a pH of from about 3 to 7 and a temperature of about 5 to 90° C. to form an N-acyldopa; and
(b) deacylating said N-acyldopa by acid hydrolysis.

9. The process of claim 8 wherein the N-acyltyrosine contains an acyl group of the general formula RCO— wherein R is selected from the group consisting of hydrogen and lower alkyl groups containing 1 to 6 carbon atoms.

10. The process of claim 8 wherein the suitable acid comprises acetic acid.

References Cited

Workman, et al., Chemical Abstracts, vol. 61 pp. 11868c–e relied on.

LORRAINE A. WEINBERGER, Primary Examiner

L. A. THAXTON, Assistant Examiner